(12) United States Patent
Liechty, II

(10) Patent No.: US 6,336,286 B1
(45) Date of Patent: Jan. 8, 2002

(54) SELF-STANDING DECOYS HAVING DIFFERENT SPATIALLY ARRANGED LEGS AND FEET

(76) Inventor: Victor Jay Liechty, II, 1250 N. 1750 W., Provo, VT (US) 84604

( * ) Notice: Subject to any disclaimer, the term of this patent is extended or adjusted under 35 U.S.C. 154(b) by 0 days.

(21) Appl. No.: 09/032,689

(22) Filed: Feb. 28, 1998

(51) Int. Cl.$^7$ ............................................. A01M 31/06
(52) U.S. Cl. .................................................. 43/3; 43/2
(58) Field of Search ........................... 43/3, 2; 446/99, 446/390

(56) References Cited

U.S. PATENT DOCUMENTS

| | | | | |
|---|---|---|---|---|
| 858,090 A | * | 6/1907 | Meinecke ..................... 446/99 |
| 1,211,590 A | | 1/1917 | Kennedy | |
| 1,714,558 A | | 5/1929 | Slater | |
| 1,777,948 A | * | 10/1930 | Eerde .......................... 446/99 |
| 2,313,353 A | | 3/1943 | Mills | |
| 2,439,710 A | | 4/1948 | Banigan | |
| 2,450,572 A | | 10/1948 | Ballard | |
| 2,622,360 A | | 12/1952 | Bertram | |
| 2,816,383 A | | 12/1957 | Locher | |
| 2,816,384 A | * | 12/1957 | Rexius ............................. 43/3 |
| 3,435,550 A | * | 4/1969 | Carlson ........................... 43/3 |
| 3,768,192 A | | 10/1973 | Caccamo | |
| 3,800,457 A | | 4/1974 | Barrett | |
| 3,888,032 A | | 6/1975 | Gagnon | |
| 4,356,659 A | | 11/1982 | Clarke | |
| 4,512,749 A | | 4/1985 | Deulofeu | |
| 4,590,699 A | | 5/1986 | Nicks | |
| 4,651,457 A | | 3/1987 | Nelson et al. | |
| 4,651,458 A | | 3/1987 | Lanius | |
| 4,658,530 A | * | 4/1987 | Ladehoff ........................ 43/3 |
| 4,768,988 A | | 9/1988 | Rutter | |
| 4,845,872 A | | 7/1989 | Anderson | |
| 4,885,861 A | * | 12/1989 | Gazalski ......................... 43/3 |
| 4,928,418 A | | 5/1990 | Stelly | |
| 5,098,050 A | | 3/1992 | Bruns et al. | |
| 5,168,649 A | * | 12/1992 | Wright ............................. 43/2 |
| 5,189,823 A | | 3/1993 | Lanius | |
| 5,199,204 A | * | 4/1993 | Lowery ........................... 43/2 |
| 5,205,060 A | * | 4/1993 | Franceschini .................... 43/3 |
| 5,231,780 A | | 8/1993 | Gazalski | |
| 5,274,942 A | | 1/1994 | Lanius | |
| 5,279,063 A | | 1/1994 | Heiges | |
| 5,289,654 A | | 3/1994 | Denny | |
| 5,293,709 A | | 3/1994 | Cripe | |
| 5,375,363 A | | 12/1994 | Higdon | |
| 5,380,233 A | * | 1/1995 | Numoto ....................... 446/92 |
| 5,788,554 A | * | 8/1998 | Goodwin et al. ........... 446/100 |

OTHER PUBLICATIONS

Cabelas Real Image Goose decoys—Cabelas Master Fall Catalog 1998 p. 408.
Spotlight on Targets Bow & Arrow Hungting May/Jun. 1995 pp. 31, 32, 34 & 35.
Real–Geese Silhouette Goose Decoys Cabela's Annual Fall Catalog 1995 p. 291.
Outlaw Decoys Cabela's Annual Fall Catalog 1995 p. 291.
Full–body Enticer—Flambeau Decoys Wildfowl Oct./Nov. 1996 p. 45.
Pacific Wings Waterfowl Adventures Wildfowl Aug./Sep. 1997 p. 62.

* cited by examiner

*Primary Examiner*—Peter M. Poon
*Assistant Examiner*—Timothy D. Collins

(57) ABSTRACT

Different shaped decoys each having a same shaped decoy body and a pair of legs, wherein the pair of legs of each decoy differs in shape from the pair of legs of each other decoy by having a different spatial arrangement of legs, such that the legs of each decoy are in different positions than the legs of each of the other decoys.

7 Claims, 6 Drawing Sheets

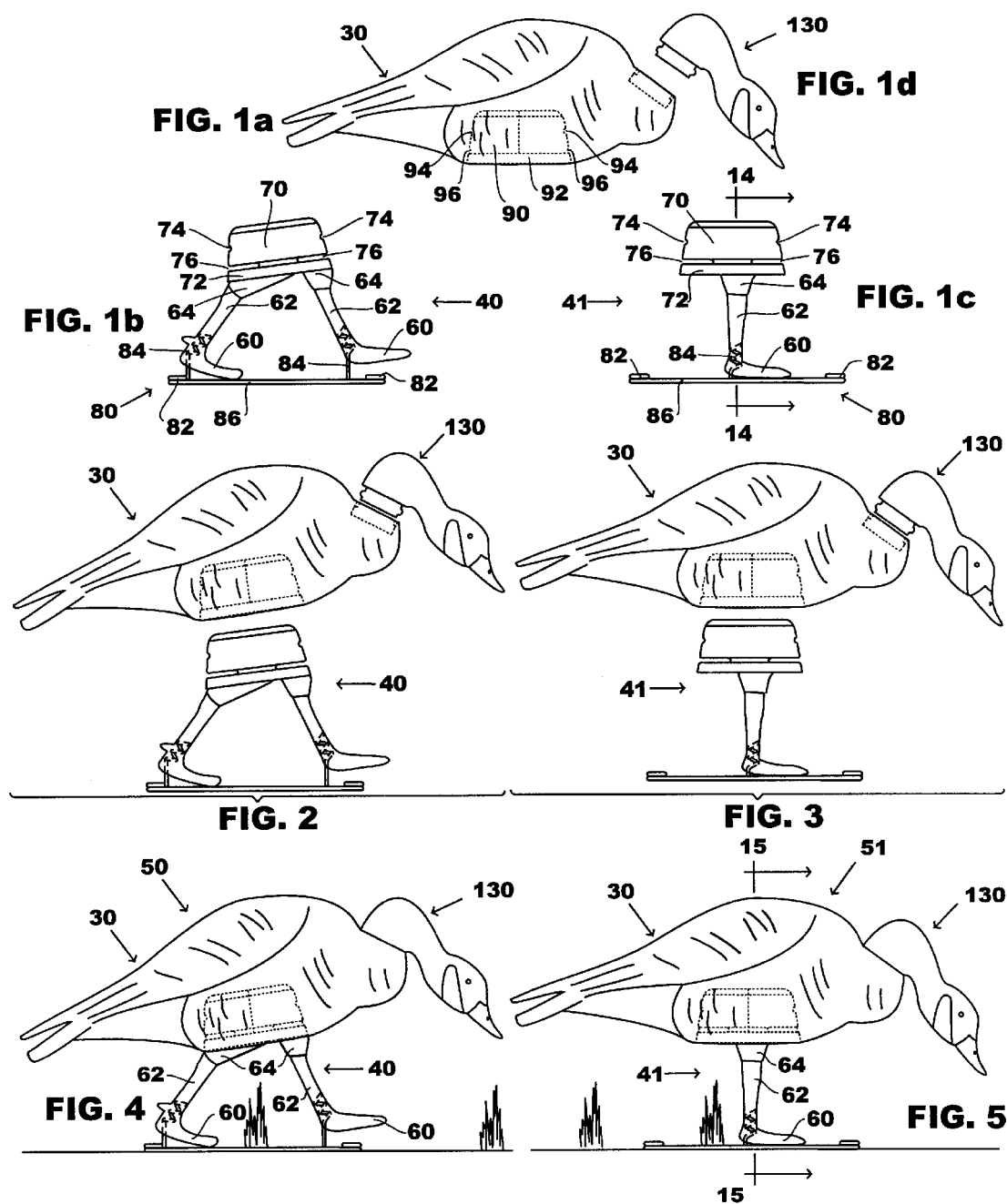

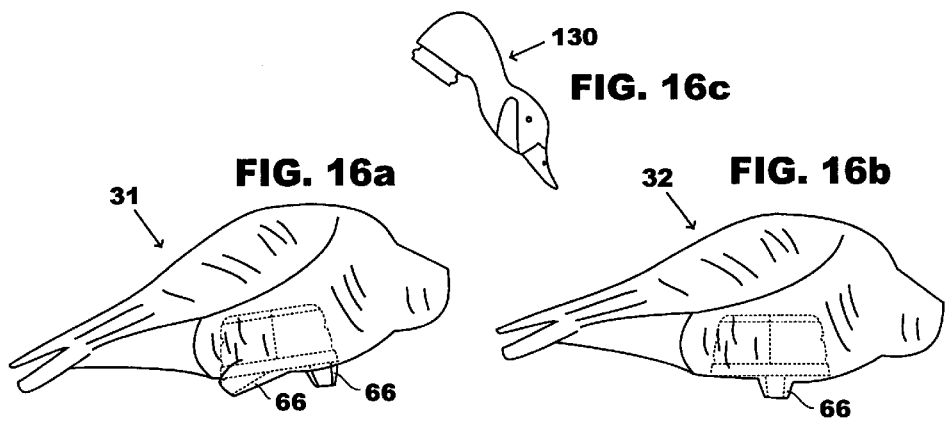
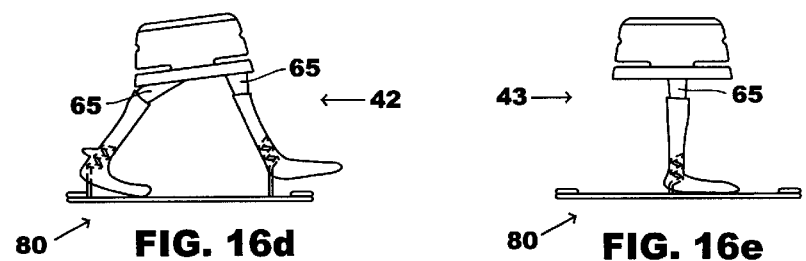
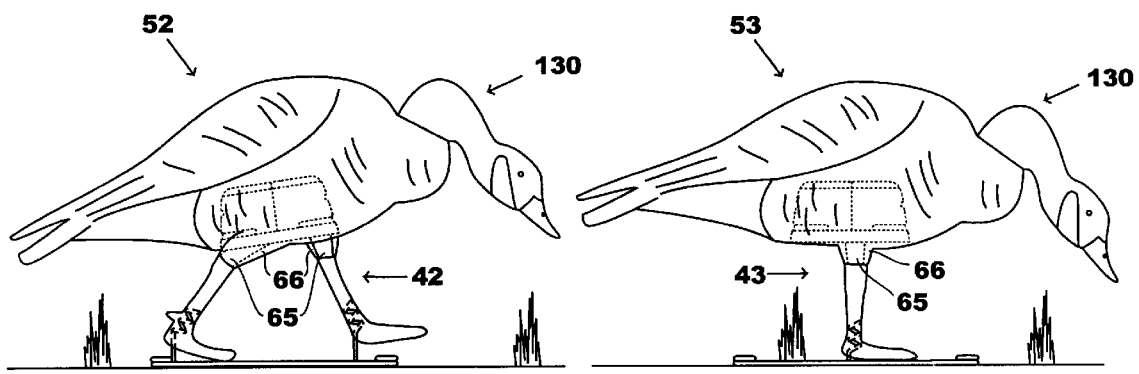

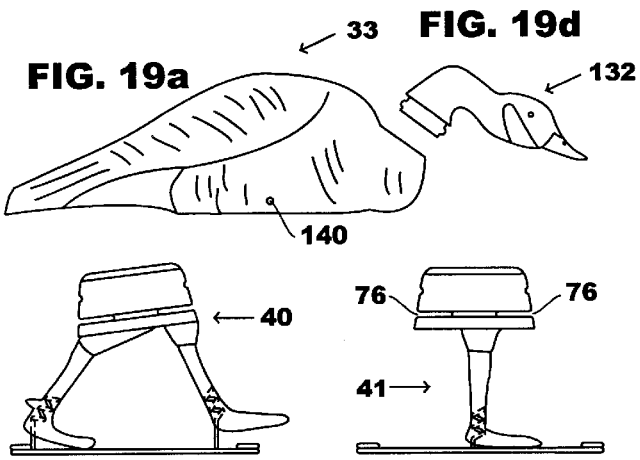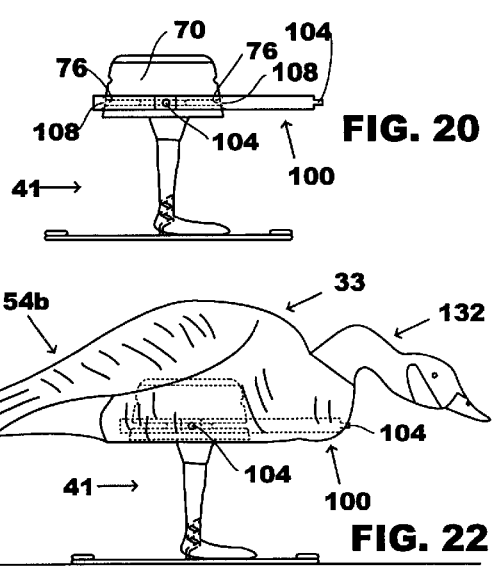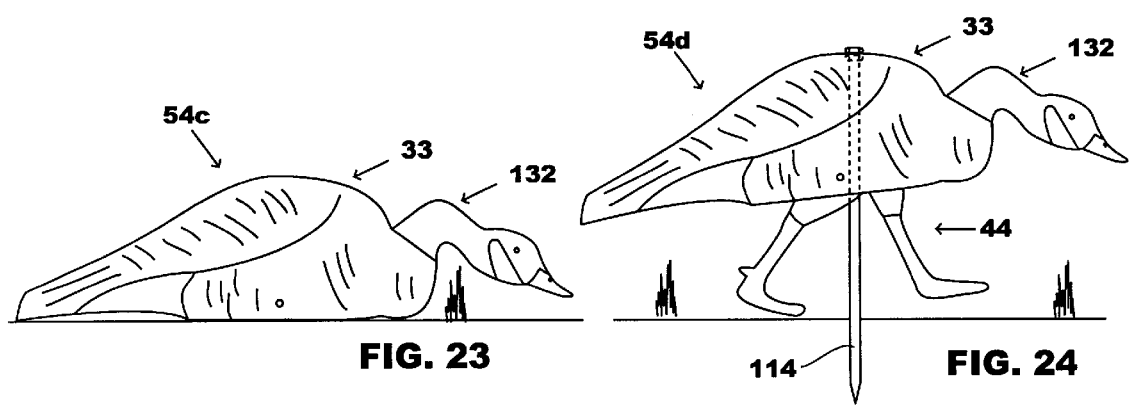

SELF-STANDING DECOYS HAVING DIFFERENT SPATIALLY ARRANGED LEGS AND FEET

BACKGROUND

Description of Prior Art

Decoys imitate animals and have been used for quite some time in hunting to lure game animals into shooting range. Decoys are currently used to hunt a variety of different animals, including deer, antelope, turkeys, crows, and waterfowl.

Ducks and geese are the most popular types of waterfowl birds hunted for sport. In the 1800's and up until the early twentieth century in what is now referred to as the market days, wild ducks and geese were commercially harvested. During this time period hunters used live-birds to decoy the waterfowl into shooting range. This practice was stopped by federal legislation in the early 1900's. Such illegalization has since led to the paramount importance of decoys to the success of the modern day waterfowl hunter.

Waterfowl decoys come in a variety of different types and styles depending on their intended use. For example, there are duck and goose decoys specifically designed for use on water, and others designed for use on land and ice. Most ducks and geese travel each day between bodies of water and agricultural fields or feeding grounds. The birds rest on the water and feed in the fields. As a strategy taking advantage of this daily flight pattern, hunters set out floating decoys on the water and attempt to lure the birds into shotgun range when the birds return from feeding in the fields. Accordingly, as another strategy taking advantage of this daily flight pattern, hunters set out decoys in the fields and attempt to lure hungry birds into shotgun range while attempting to imitate a flock of feeding live-birds with a group of decoys or a decoy spread.

Probably the most popular method of hunting geese is decoying in agricultural fields. Common types of field decoys for goose hunting include, shells, full-bodies, silhouettes, rags and kites. Silhouettes are flat two dimensional cutouts from sheet material of about an eighth of an inch thick, and are staked above the ground in a vertical position so as to be clearly seen from a side view by approaching birds. A second type of two dimensional cutout decoy is laid flat on the ground so as to be clearly seen from above by circling birds. Shells, full-bodies, rags and kites are generally a more realistic representation of live-birds than the two dimensional decoy types since they utilize all three dimensions to decoy, and therefore are seen from all angles by approaching and circling geese.

Full-body and shell decoys are generally the most popular types of decoys for goose hunting on land and ice since they appear the most realistic from all angles. Both full-body and shell decoys have a decoy body and a head-and-neck section or piece. The head-and-neck section may be removably attachable or integral with the decoy body. Full-body goose decoys have a fully enclosed spherical body and generally have attachable leg-and-foot pieces. The leg-and-foot pieces give the decoys the added realism of legs and feet, which better imitates standing, feeding birds. Shell decoys have semi-spherical bodies which have an open underside so as to be stackable upon one another during transport. Shell decoys are most commonly laid flat on the ground and best imitate resting birds or birds that are feeding while laying down. Shell decoys however, may also be positioned above the ground so as to provide the enhanced realism of standing birds. Standing shell decoys are most generally positioned above the ground with stakes, but may also use attachable leg-and-foot pieces.

Most standing decoys require the use of stakes at all times to help maintain them in a standing position. Other standing decoys rely solely upon the base and/or leg-and-foot piece for balance, and therefore do not require the use of stakes, except for in windy conditions. Most types of shell decoy and full-body decoy leg-and-foot pieces have a plastic base that is directly molded to the feet which helps balance the decoy. The feet of other standing shell and full-body decoys' leg-and-foot pieces contact the ground directly to aid in maintaining the decoy in a standing position. Some decoys whose feet contact the ground have oversized feet and utilize only the feet to maintain the decoys standing, except for in windy conditions where stakes are required. Other decoys whose feet contact the ground use stakes at all times in addition to their feet, to maintain the decoys in a standing position.

Maintaining full-body and standing shell decoys in a realistic standing position is very important to having a realistic decoy spread. Attempts in the prior art have been made to increase the effectiveness and ease of maintaining shell and full-body decoys in a realistic standing position, but these attempts have their own problems as well. Some of such problems revolve around decreased realism of the decoys individually. For example, disproportionate body parts such as oversized feet or a large base attached to the feet, and stakes protruding from the decoy bodies look unnatural and can scare away wary geese. Also, when prior art standing decoys are positioned on uneven ground, as is very common in hunting conditions, the decoys are commonly tilted at unnatural angles since the feet or bases get tilted by the bumps and depressions in the ground. This will especially alarm approaching geese. Other problems associated with maintaining prior art standing decoys in a realistic standing position include inconveniences and time involvement the hunter must put up with when installing stakes, and when attempting to secure the decoys in a standing position to ice or frozen ground, especially when in windy conditions.

The more a decoy spread imitates a flock of live-birds the more effective it will be in providing hunting success. The realism of a decoy spread is dependent on not only how realistic each individual decoy is but on how the decoys as a group duplicate the active flock effect of the live-birds they are imitating.

Attempts in the prior art have been made to increase the realism and effectiveness of field decoy spreads for waterfowl hunting, but these attempts have their own problems as well. Since all prior art waterfowl field decoy spreads have decoys with identical shaped decoy bodies where the legs and feet attached to such decoy bodies are all substantially exactly identical to each other, the ability of prior art decoy spreads to effectively and easily create the imagery of a flock of actively feeding live-birds is limited. For example, all prior art decoy spreads of standing full-body and standing shell goose decoys with legs and feet, exhibit "tin-soldier syndrome" wherein the legs and feet of each such decoy are straight, parallel and identical to each other. A decoy spread of such decoys gives the appearance of a battalion at attention. Nothing could be more uncharacteristic of a flock of feeding geese that is actively walking around searching for and consuming food.

It is apparent that there are needed improvements in the realism of decoys.

It is apparent that there is a need for a decoy that is capable of being easily secured to hard surfaces such as to frozen ground and ice.

It is apparent that there is a need for a self-standing decoy that is capable of being secured in a standing position upon uneven surfaces so that the decoy is not tilted at an unnatural angle.

It is apparent that there is a need for a decoy that does not portray any disproportionate or unrealistic shapes when secured in a standing position.

It is further apparent that there is a need for decoys which have the same decoy body but which have legs and feet that are not identical to the legs and feet of the other decoys having the same decoy bodies, so as to create decoy spreads that more realistically imitate the active flock effect or imagery of feeding birds, that are walking around looking for and consuming food.

It is yet further apparent that there is a need for three-dimensional standing goose decoys which have legs and feet that are not identical to each other, so as to create decoy spreads that more realistically imitate the active flock effect or imagery of feeding birds, that are walking around looking for and consuming food.

SUMMARY OF THE INVENTION

It is one object of the present invention to provide more realistic decoys.

It is another object of the present invention to provide a decoy that is capable of being easily secured to hard surfaces such as frozen ground and ice.

It is another object of the present invention to provide a self-standing decoy that is capable of being secured in a standing position upon uneven surfaces so that the decoy is not tilted at an unnatural angle.

It is another object of the present invention to provide a decoy that does not portray any disproportionate or unrealistic shapes when secured in a standing position, such as oversized feet or a noticeable standing base.

It is another objective of the present invention to provide decoys which have the same decoy body but that which each have different shaped legs and feet, such that the legs and feet of each decoy are in different positions than the legs and feet of each of the other decoys which have the same decoy bodies, so as to create decoy spreads that more realistically imitate the active flock effect or imagery of feeding birds, that are walking around looking for and consuming food.

It is further another objective of the present invention to provide three-dimensional full-body goose decoys which each have different shaped legs and feet, such that the legs and feet of each decoy are in different positions than the legs and feet of each of the other decoys, so as to create decoy spreads that more realistically imitate the active flock effect or imagery of feeding birds, that are walking around looking for and consuming food.

It is yet further another objective of the present invention to provide three-dimensional standing shell goose decoys which each have different shaped legs and feet, such that the legs and feet of each decoy are in different positions than the legs and feet of each of the other decoys, so as to create decoy spreads that more realistically imitate the active flock effect or imagery of feeding birds, that are walking around looking for and consuming food.

The foregoing objects and advantages and other objects and advantages of the present invention are accomplished according to one preferred embodiment of this invention with a plurality of the same shaped full-body goose decoy bodies, a plurality of different shaped removably attachable head-and-neck pieces, and a plurality of different shaped removably attachable foot-and-leg assemblies. The different shaped foot-and-leg assemblies each have a pair of legs and corresponding feet, and differ in shape from one another by having a different spatial arrangement of legs and feet, wherein the legs and feet of each foot-and-leg assembly are in different positions than the legs and feet of each of the other foot-and-leg assemblies. The different positions that the legs and feet are in correspond to the various exact foot and leg positions live geese exhibit while walking around and feeding. All of the different shaped foot-and-leg assemblies are removably attachable to all of the decoy bodies. A pair of wings extending from the top of each foot-and-leg assembly mate in corresponding slots formed in the bottom of each decoy body in such a manner that each foot-and-leg assembly is securely held attached to a corresponding decoy body by frictional engagement. A wire base is integrally molded to the feet of each foot-and-leg assembly and serves to render each decoy self-standing without the aid of staking, except for in extreme windy conditions. The wire base is capable of straddling bumps or uneven spots in the ground so as to retain the decoy in a natural position at all time regardless of the contours of the terrain. The wire base is also capable of being easily and quickly hid from sight by moving it back and forth in the dirt, snow or low cut vegetation until it is completely covered. The wire base has two loops swaged in it that allow the decoy to be staked to the ground. The loops in the wire base are contoured such that they fit the exact thread pitch and diameter of a ice screw or bolt, so that the decoy can be firmly secured to ice or frozen ground such that the bolt threads mate with the contours of each wire loop and firmly hold the decoy secured even when the bolt is not fastened completely snug to the ground or ice.

Another preferred embodiment according to this invention differs from the above described preferred embodiment in that there are two different shaped full-body goose decoy body styles. The two different shaped full-body goose decoy body styles differ in shape from each other in the location of where the head-and-neck pieces attach. Also, all of the different shaped foot-and-leg assemblies are removably attachable to both of the two different shaped decoy body styles.

Another preferred embodiment according to this invention differs from the above described preferred embodiments in that there are more than two different shaped full-body decoy body styles. According to one such preferred embodiment each decoy body has thighs molded to it on each side of the decoy body. Except for the location where the head-and-neck pieces attach, the decoy bodies differ in shape by the locations of where the thighs are molded onto the bodies. The thighs are molded onto the decoy bodies in such locations so as to line-up or be in position with the legs of the different foot-and-leg assemblies when corresponding foot-and-leg assemblies are attached to corresponding decoy bodies.

Other preferred embodiments of this invention differ from the above described preferred embodiments in that they have shell decoy bodies to which foot-and-leg assemblies are removably attachable. According to one such shell decoy body preferred embodiment the same foot-and-leg assemblies that attach to a full-body decoy body also attach to the shell decoy bodies. According to one such preferred embodiment the full-body foot-and-leg assemblies are attached to the shell decoy bodies by a separate coupler piece that is first attached to a foot-and-leg assembly and then the coupler and foot-and-leg assembly is attached to the shell decoy body. Some shell decoy body preferred embodiments according to this invention have different shaped shell decoy bodies, wherein the shell decoy bodies differ in shape from each other by the location of where the head-and-neck pieces attach.

According to the above described preferred embodiments of this invention, when each different shaped foot-and-leg assembly is attached to a corresponding decoy body and placed upon the ground, the decoy body is positioned in a different position relative to the ground. The exact different positions the decoy body is positioned in when having each different foot-and-leg assembly attached corresponds to the exact position a live goose's body would be in relative to the ground when its legs and feet are in the position of the legs and feet of the particular attached foot-and-leg assembly. The number of different shaped foot-and-leg assemblies is enough to reproduce all of the common body positions and corresponding feet and leg positions exhibited by geese when walking around and feeding etc. So, by simply attaching the different shaped head-and-neck pieces and different shaped foot-and-leg assemblies to corresponding decoy bodies, decoy spreads having decoys with legs, feet and bodies in different natural positions are created. Such decoy spreads more realistically create the imagery of an actively feeding flock of geese walking around searching for and consuming food. Such decoy spreads are also more effective and therefore provide increased hunting success.

Yet other preferred embodiments according to this invention differ from the above described preferred embodiments in that the legs and feet are molded to or are integral with the decoy bodies. Such preferred embodiments comprise a plurality of the same shaped decoy bodies where each decoy body has a different shaped pair of legs and corresponding feet molded thereto or integral therewith. The decoy bodies according to such preferred embodiments include silhouette and full-body decoy bodies, and may have removably attachable or integral head-and-neck sections. The decoys according to such preferred embodiments are also capable of producing all of the common body positions and corresponding feet and leg positions exhibited by geese when walking around and feeding, such that decoy spreads are produced which create the imagery of an actively feeding flock of geese walking around searching for and consuming food as according to the desired results of this invention.

The preferred embodiments of this invention provide more realistic decoys and decoy spreads. The decoys according this invention are capable of straddling bumps and uneven terrain so as to prevent the decoys from being tilted at unnatural angles. The decoys according to this invention do not have any disproportionate body parts or unnatural bases or shapes that could scare approaching geese. The decoys according to this invention are capable of having their standing bases easily and quickly hid from sight, by covering the wire base in dirt, snow or vegetation. The decoys according to this invention are self-standing and are capable of being easily staked down in windy conditions and to frozen ground or ice. The decoys according to this invention produce decoys and decoy spreads that are a more realistic imitation of live-birds than prior art decoys.

As has been shown in the above discussion, the decoys according to this invention overcome deficiencies inherent in prior art decoys.

With the above objects and advantages in view, other objects and advantages of the invention will more readily appear as the nature of the invention is better understood, the invention is comprised in the novel construction and assembly of parts herein more fully described, illustrated and claimed.

BRIEF DESCRIPTION OF THE DRAWINGS

FIG. 1a is a side view of a full-body decoy body according to one preferred embodiment of this invention.

FIG. 1b is a side view of a foot-and-leg assembly according to one preferred embodiment of this invention.

FIG. 1c is a side view of another foot-and-leg assembly according to one preferred embodiment of this invention.

FIG. 1d is a side view of a head-and-neck piece according to one preferred embodiment of this invention.

FIG. 2 is an exploded side view of a decoy according to one preferred embodiment of this invention, showing a decoy body as illustrated in FIG. 1a, a foot-and-leg assembly as illustrated in FIG. 1b and a head-and neck-piece as illustrated in FIG. 1d.

FIG. 3 is an exploded side view of another decoy according to one preferred embodiment of this invention, showing a decoy body as illustrated in FIG. 1a, a foot-and-leg assembly as illustrated in FIG. 1c and a head-and neck-piece as illustrated in FIG. 1d.

FIG. 4 is a side view of a full-body decoy according to one preferred embodiment of this invention showing the foot-and-leg assembly of FIG. 1b attached to the decoy body of FIG. 1a.

FIG. 5 is a side view of another full-body decoy according to one preferred embodiment of this invention showing the foot-and-leg assembly of FIG. 1c attached to the decoy body of FIG. 1a.

FIG. 10 is a bottom view of the decoy body as illustrated in FIG. 1a.

FIG. 12 is an enlarged view of the side of the decoy body as illustrated in FIG. 1a.

FIG. 16a is a side view of a full-body decoy body according to another preferred embodiment of this invention.

FIG. 16b is a side view of another full-body decoy body according to a preferred embodiment of this invention.

FIG. 16c is a side view of a head-and-neck piece according to a preferred embodiment of this invention.

FIG. 16d is a side view of a foot-and-leg assembly according to a preferred embodiment of this invention.

FIG. 16e is a side view of another foot-and-leg assembly according to a preferred embodiment of this invention.

FIG. 17 is a side view of a full-body decoy according to a preferred embodiment of this invention with the foot-and-leg assembly of FIG. 16d attached to the decoy body of FIG. 16a.

FIG. 18 is a side view of another full-body decoy according to a preferred embodiment of this invention with the foot-and-leg assembly of FIG. 16e attached to the decoy body of FIG. 16b.

FIG. 19a is a side view of a shell body decoy body according to another preferred embodiment of this invention.

FIG. 19b is a side view of the foot-and-leg assembly as illustrated in FIG. 1b according to this invention.

FIG. 19c is a side view of the foot-and-leg assembly as illustrated in FIG. 1c according to this invention.

FIG. 19d is a side view of a head-and-neck piece according to one preferred embodiment of this invention.

FIG. 19e is a top view of a coupler according to one preferred embodiment of this invention.

FIG. 20 is a side view of the coupler of FIG. 19e attached to the foot-and-leg assembly of FIG. 19c according to one preferred embodiment of this invention.

FIG. 21 is a side view of a standing shell decoy according to one preferred embodiment of this invention showing the foot-and-leg assembly of FIG. 1b and attached coupler of FIG. 19e attached to the shell decoy body of FIG. 19a.

FIG. 22 is a side view of another standing shell decoy according to one preferred embodiment of this invention showing the foot-and-leg assembly of FIG. 1c and coupler of FIG. 19e attached to the shell decoy body of FIG. 19a.

FIG. 23 is a side view of a shell decoy laying on the ground, according to one preferred embodiment of this invention.

FIG. 24 is a side view of another standing shell decoy according to another preferred embodiment of this invention.

Figure 6:
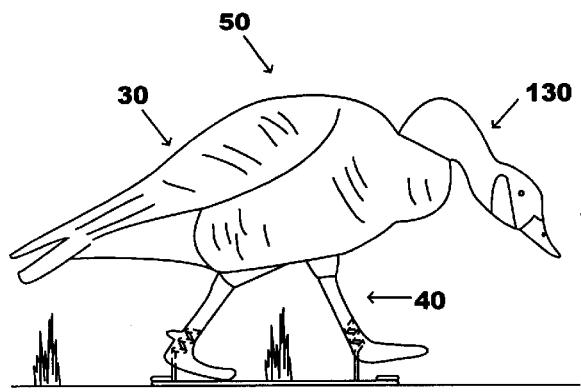
FIG. 6 is a side view of the decoy as illustrated in FIG. 4.

REFERENCE NUMERALS IN DRAWINGS 30 decoy body
31 decoy body
32 decoy body
33 decoy body
34 decoy body
35 decoy body
40 foot-and-leg assembly
41 foot-and-leg assembly
42 foot-and-leg assembly
43 foot-and-leg assembly
44 foot-and-leg assembly
50 decoy
51 decoy
52 decoy
53 decoy
54a decoy
54b decoy
54c decoy
54d decoy
55 decoy
56 decoy
57 decoy
58 decoy
59 decoy
60 foot
62 calve
64 thigh
65 stem
66 thigh
68 thigh
69 thigh
70 wing
72 leg bar
74 upper notch
76 lower notch
78 handle
80 wire standing base
82 loop
84 foot wire extension
86 perimeter wire
88 void
90 wing receiving slot
92 leg bar void
94 upper knob
96 lower knob
98 handle void
99 handle hole
100 coupler
102 arm
104 detent
106 wing receiving slot
108 ridge
110 stake
112 bolt
114 stake
116 stake
120 longitudinal vertical bisecting plane
130 head-and-neck piece
132 head-and-neck piece
134 head-and-neck piece
136 head-and-neck piece
140 hole

DETAILED DESCRIPTION OF THE PREFERRED EMBODIMENTS

FIGS. 1a–1d illustrate a preferred embodiment according to this invention wherein a plurality of different shaped foot-and-leg assemblies 40 & 41 are removably attachable to a plurality of same shaped full-body goose decoy bodies 30, such that a decoy system for producing decoys as according to this invention is created. Both foot-and-leg assemblies 40 & 41 have a wire standing base 80, a pair of feet 60—60, a pair of calves 62—62, a pair of thighs 64—64, a pair of leg bars 72—72, and a pair of wings 70—70. As used throughout this specification and in the claims the term leg or legs refers to any combination of corresponding calves and/or thighs. A calve is the general anatomical structure of each leg between the ankle and knee, and a thigh is the general anatomical structure of each leg between the knee and hip.

As illustrated in FIGS. 1b & 1c each wire standing base 80 has a pair of loops 82—82 that can be used to stake or bolt each decoy to the ground. Each wire standing base 80 has an outer perimeter wire 86 that is dispersed over a large enough area so as to maintain its corresponding decoy self-standing without the aid of staking, except for in extreme windy conditions. Each wire standing base 80 is capable of straddling bumps or uneven spots in the ground so as to retain the decoys in natural positions at all time regardless of the contours of the terrain. Wire standing bases 80 are also capable of being easily and quickly hid from sight by moving each decoy back and forth in the dirt, snow or low cut vegetation until outer perimeter wires 86 are completely covered. It is apparent that camouflage tape or paint of different colors may be applied to wire standing bases 80 as another method of their concealment. The shape of each wire standing base 80 is preferably substantially rectangular, but may have other shapes, such as an H, Y, X, FIG. 8 or circular, or other variations therebetween. A pair of foot wire extensions 84—84 extending from each wire standing base 80 are integrally molded into feet 60—60 of each foot-and-leg assembly. It is apparent that each wire standing base 80 may not be integrally molded to feet 60—60 of each corresponding different shaped foot-and-leg assembly, but may be removably attachable, without deterring from the desired results of this invention. It is apparent that only one foot 60 of each foot-and-leg assembly or of each decoy, of the decoys according to this invention may be attached, whether integrally so or not, to each corresponding wire standing base 80. It is also apparent that the feet of each decoy according to this invention may or may not contact corresponding perimeter wire 86. It is apparent that each wire standing base 80 may be fabricated from more than one piece of wire and that such multiple wire pieces may be welded together. It is also apparent that there are equivalents of wire standing base 80 that could exist and that could be made of various different materials which can serve to provide the equivalent function each wire standing base 80 provides as according to this invention.

Foot-and-leg assemblies 40 & 41 as illustrated in FIGS. 1b & 1c each have one leg -thigh 64 & calve 62-, and one corresponding foot 60 connected to each leg bar 72. Each wing 70 has a pair of upper notches 74—74 and a pair of lower notches 76—76. Wings 70—70 are straight, flat sided, situated parallel to each other and are of uniform thickness except at their top ends where they are rounded and taper slightly. Decoy body 30 has a pair of wing receiving slots 90—90, and a pair of leg bar receiving voids 92—92. FIG. 1a illustrates right wing receiving slot 90 which has a pair of upper knobs 94—94 and a pair of lower knobs 96—96. When a foot-and-leg assembly is attached to decoy body 30, wings 70—70 mate in wing receiving slots 90—90, and leg bars 72—72 mate in leg bar receiving voids 92—92, such that notches 74—74, 74—74 mate with knobs 94—94, 94—94 and notches 76—76, 76—76 mate with knobs 96—96, 96—96. This aids in the secure attachment of decoy bodies 30 to corresponding foot-and-leg assemblies. A head-and-neck piece 130 as illustrated in FIG. 1d is removably attachable to each decoy body 30. It is apparent that a plurality of different shaped head-and-neck pieces can all be removably attachable to each decoy body 30. Each decoy body 30 is substantially identical to each other decoy body 30, and therefore decoy bodies 30 comprise a plurality of same shaped decoy bodies. It is apparent that same shaped decoy bodies 30 as according to this invention may vary slightly in exact identicalness to each other or from having the same shape as each other, due to possible variations in painting patterns, and/or scars, marks or other deformations involved from mold removal, and possible anomalies from the molding process.

Figure 7:
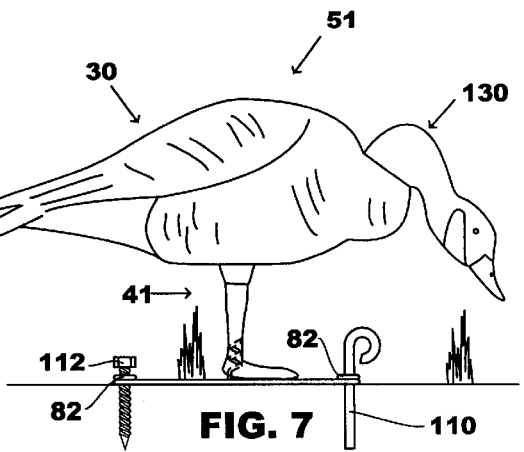
FIG. 7 is a side view of the decoy as illustrated in FIG. 5.
Figure 8:
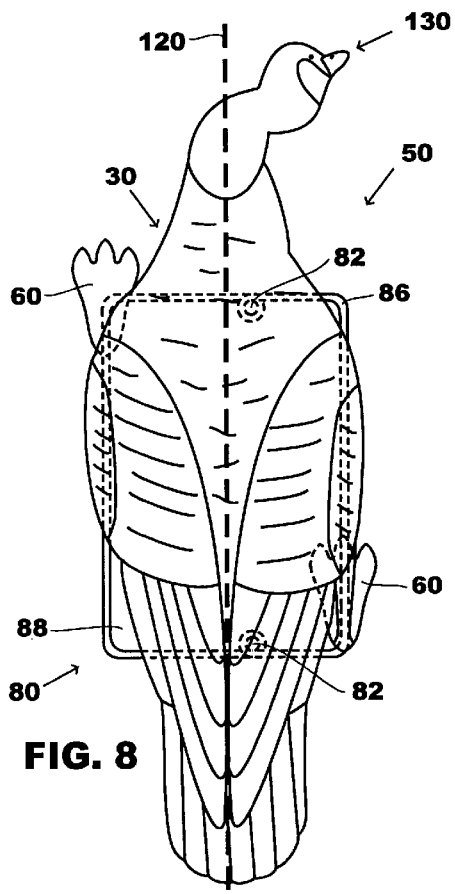
FIG. 8 is a top view of the decoy as illustrated in FIG. 6.
Figure 9:
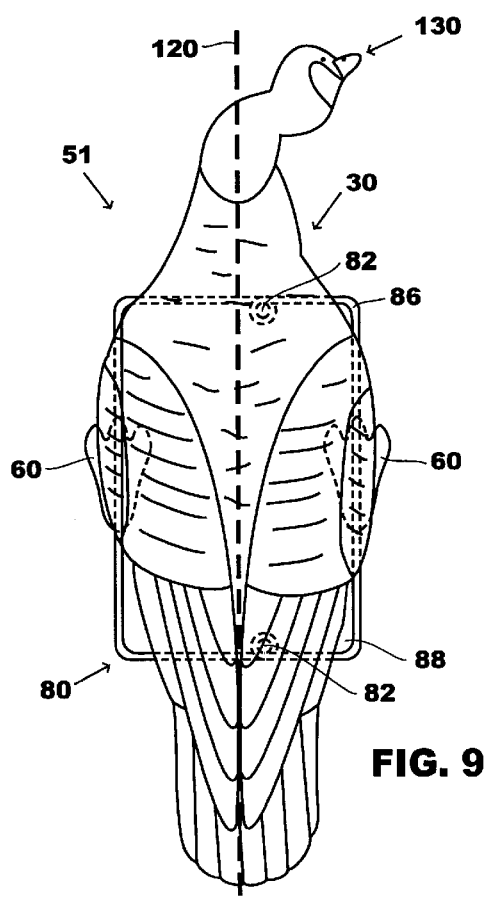
FIG. 9 is a top view of the decoy as illustrated in FIG. 7.

A decoy system for producing decoys as according to the preferred embodiment of this invention as depicted in FIGS. 1a–1d is further illustrated in FIGS. 2 & 3 wherein foot-and-leg assemblies 40 & 41 are shown to be both removably attachable to decoy bodies 30. A full-body Canada goose decoy 50 as illustrated in FIGS. 4, 6 & 8 is produced when decoy body 30 and attached head-and-neck piece 130, are attached to foot-and-leg assembly 40. A different full-body Canada goose decoy 51 as illustrated in FIGS. 5, 7 & 9 is produced when decoy body 30 and attached head-and-neck piece 130, are attached to foot-and-leg assembly 41. Foot-and-leg assemblies 40 & 41 differ from each other in shape in that they each have a different spatial arrangement of legs and feet. As used throughout this specification and in the claims having a different spatial arrangement as according to this invention has the intended meaning that like parts, such as pairs of feet and/or legs or their equivalents, of different decoys or of different foot-and-leg assemblies, occupy a different area of space than each other, as referenced from a similar reference point, such as when attached to the under-side of their corresponding decoy bodies. For example, the area of space that legs and feet of foot-and-leg assembly 40 occupy under decoy body 30 when foot-and-leg assembly 40 is attached to decoy body 30, is different than the area of space legs and feet of foot-and-leg assembly 41 occupy under decoy body 30 when foot-and-leg assembly 41 is attached to decoy body 30. More specifically, when corresponding foot-and-leg assemblies 40 & 41 are individually attached to decoy body 30, as illustrated in FIGS. 4 & 5, calves 62—62 of foot-and-leg assembly 40 occupy a different area of space under decoy body 30 than the area of space calves 62—62 of foot-and-leg assembly 41 occupy under decoy body 30, thighs 64—64 of foot-and-leg assembly 40 occupy a different area of space under decoy body 30 than the area of space thighs 64—64 of foot-and-leg assembly 41 occupy under decoy body 30, and feet 60—60 of foot-and-leg assembly 40 occupy a different area of space under decoy body 30 than the area of space feet 60—60 of foot-and-leg assembly 41 occupy under decoy body 30.

Having a different spatial arrangement as according to this invention also has the intended meaning that like parts, such as pairs of feet and/or legs or their equivalents of different decoys, are in different positions than each other. For example, as is clearly shown in FIGS. 6 & 8 the legs and feet of decoy 50 are not parallel to each other and are not identical to each other, such that decoy 50 generally represent a walking goose. As is clearly shown in FIGS. 7 & 9 the legs and feet of decoy 51 are generally straight, parallel to each other and are substantially identical to each other, such that decoy 51 represents a stationary goose. Therefore, the pair of legs and corresponding feet of decoy 50 are in different positions than the pair of legs and corresponding feet of decoy 51 and thus the legs and feet of decoys 50 & 51 have different spatial arrangements than each other.

FIG. 7 shows that a stake 110 and a bolt or self-tapping ice screw 112 can be used to firmly attach wire base 80 to surfaces by inserting stake 110 or bolt 112 through loops 82—82, so as to maintain decoy 51 standing in extreme windy conditions. Loops 82—82 of each wire standing base 80 are preferably swaged portions of outer perimeter wire 86 and have such an internal diameter and pitch in the bend of the wire so that the threads of bolt 112 mate with the contours of each corresponding wire loop 82 and enable the foot-and-leg assemblies and corresponding decoys to be firmly attached to hard surfaces such as to ice or frozen ground without the bolt having to be completely fastened snug to the ground or ice.

FIG. 8 shows that a vertical plane passing through the center of mass of the junctures of feet 60—60 and calves 62—62, or the ankles of decoy 50 is not perpendicular to a longitudinal vertical bisecting plane 120 of decoy body 30. FIG. 9 shows that longitudinal vertical bisecting plane 120 of decoy body 30 is substantially perpendicular to a vertical plane passing through the center of mass of junctures of feet 60—60 and calves 62—62, or the ankles of decoy 51. It is apparent that feet 60—60 of each decoy as according to the preferred embodiments of this invention whether having foot-and-leg assemblies or integrally attached legs and feet that utilize a wire standing base 80 or its equivalent, may be positioned anywhere along perimeter wires 86 or their equivalents of wire standing bases 80. It is also apparent that thighs 64—64 of each different foot-and-leg assembly of the preferred embodiment of this invention as illustrated in FIGS. 1–9 may be connected to their corresponding leg bars 72—72 at any location along leg bars 72—72.

As illustrated in FIGS. 8 & 9 the substantially rectangular shape of wire bases 80 of both decoys 50 & 51 are preferably designed so that perimeter wires 86 each are dispersed over a large enough area so as to maintain corresponding decoys standing without the aid of staking. As illustrated in FIGS. 8 & 9 a void 88 is created by perimeter wire 86 of each wire base 80. Standing means according to this invention has the intended meaning that a wire base or other similar stabilizing component be integrally molded with or permanently attached to each decoy's foot or leg or feet and/or legs or equivalents so as that the stabilizing component is dispersed over a sufficient area to maintain the decoy self-standing without the aid of staking, except for in extreme windy conditions. A stabilizing component is anything that creates a void or an empty space as does a frame, such that the stabilizing component is slender enough or of small enough diameter to be easily hid in the dirt snow or vegetation, yet be strong enough to last the rigors of extended use in the field, as is according to the desired results of the standing means and standing bases of this invention. It is apparent that the shapes of voids created by the wire bases or equivalents of the stabilizing components according to this invention may be fully enclosed such as void 88 is encompassed or enclosed by substantially rectangular shaped wire standing base 80. It is also apparent that the shapes of voids created by the wire bases or equivalents of the stabilizing components according to this invention may not be fully enclosed such as would an H or X shaped base or frame produce.

A decoy system according to this invention is defined as the elements necessary to create a decoy spread, or a plurality of individual decoys in a group. A decoy system for producing decoys as according to the desired results of this invention, and as illustrated for example in FIGS. 1–9 as according to one preferred embodiment of this invention, is accomplished by a plurality of different shaped foot-and-leg assemblies that each have a different spatial arrangement of legs and feet, and that are each removably attachable to same shaped decoy bodies 30. Such a decoy system produces different decoys by attachment of the different shaped foot-and-leg assemblies to the decoy bodies 30. For simplicity of illustration FIGS. 1–9 show only two different shaped foot-and-leg assemblies 40 & 41 in the plurality of different shaped foot-and-leg assemblies, which are both removably attachable to a decoy body 30. It is apparent however as according to the decoy systems of the preferred embodiments of this invention having removably attachable foot-and-leg assemblies that the number of different shaped foot-and-leg assemblies in the plurality of different shaped foot-and-leg assemblies can be enough to produce all of the common body positions and corresponding feet and leg positions exhibited by live geese, especially by live geese that are walking around and feeding.

Each different shaped foot-and-leg assembly as according to the preferred embodiment of this invention as illustrated in FIGS. 1–9 has a different spatial arrangement of legs and feet such that when individually attached to decoy body 30 and positioned upon a surface, decoy body 30 is positioned in a different position relative to that surface. As according to this invention it is apparent that foot-and-leg assemblies having different spatial arrangements of legs and feet than each other when individually attached to the same decoy body may position that decoy body in substantially the same position with respect to the surface the decoy is positioned on. A foot-and-leg assembly being individually removably attachable to a decoy body as according to this invention has the intended meaning that only one foot-and-leg assembly is removably attachable at a time to each location on a decoy body where foot-and-leg assemblies can be attached to that decoy body. Goose decoys of this invention preferably have only one location to attach foot-and-leg assemblies or equivalents to. A foot-and-leg assembly comprises a pair of feet and legs, and may be comprised of a plurality of parts, such as separate legs, which legs may each separately attach to the decoy body at different locations.

It is apparent that a decoy system similar to the decoy system as illustrated in FIGS. 1–9 is attainable as according to this invention, which has decoy bodies differing substantially in shape by only where the head-and-neck pieces attach. Such a decoy system would therefore have a plurality of different shaped decoy bodies, as well as a plurality of different shaped removably attachable foot-and-leg assemblies.

FIGS. 10–15 show how foot-and-leg assemblies according to the preferred embodiment of this invention as illustrated in FIGS. 1–9 attach to decoy bodies 30. It is to be understood that the manner and methods of attaching foot-and-leg assemblies or their equivalents to decoy bodies is of relatively minor importance to the scope of this invention. Because as is readily apparent to those skilled in the art there are many alternative suitable methods for attaching foot-and-leg assemblies or leg-assemblies or various forms of their equivalents to decoy bodies. Therefore, the details of attachment of foot-and-leg assemblies or their equivalents as disclosed in FIGS. 1–15 of one of the preferred embodiments of this invention is only illustrative of an example of how foot-and-leg assemblies may be attached to the decoy bodies according to this invention.

Figure 10:
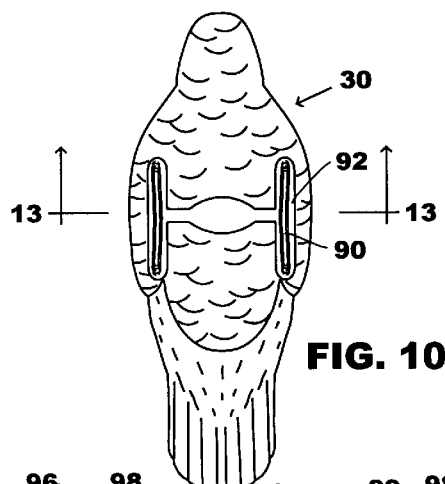
Figure 13:
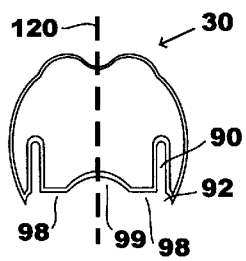
FIG. 13 is the cross-sectional view of the decoy body as illustrated in FIG. 10 at 13—13.
Figure 14:
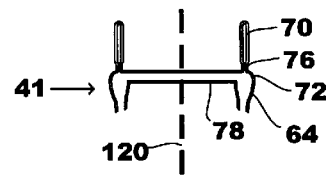
FIG. 14 is the cross-sectional view of the foot-and-leg assembly as illustrated in FIG. 1c at 14—14.
Figure 15:
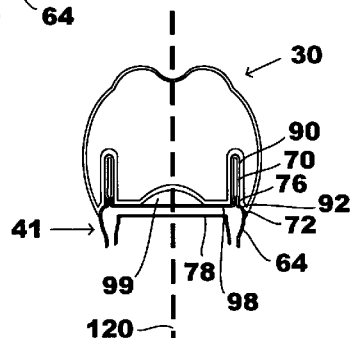
FIG. 15 is the cross-sectional view of the decoy of FIG. 5 at 15—15 as according to one preferred embodiment of this invention.
Figure 11:
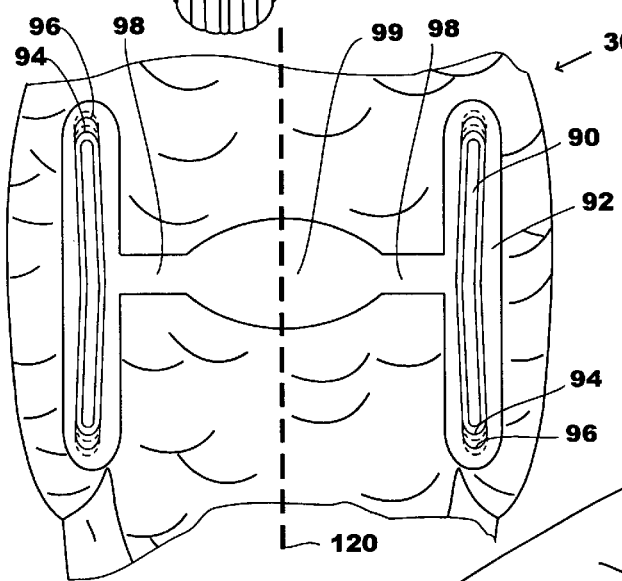
FIG. 11 is an enlarged view of the underside of the decoy body as illustrated in FIG. 10.
Figure 12:
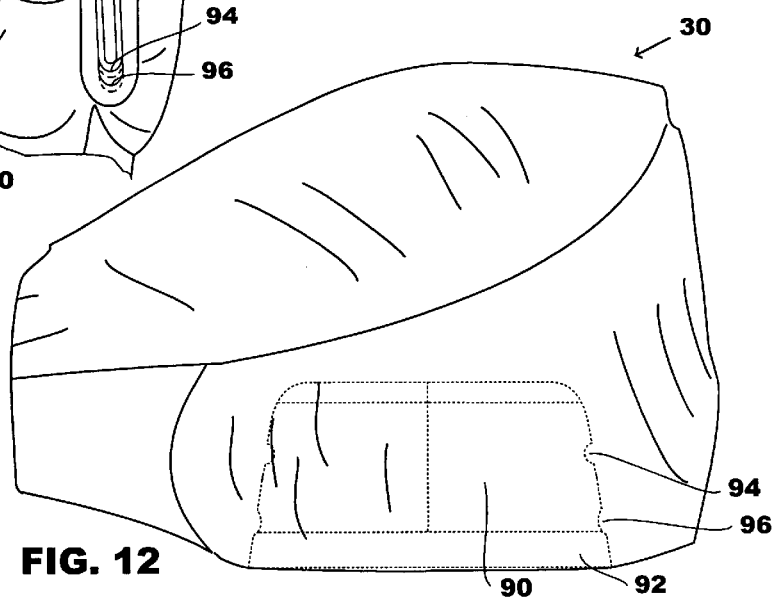

FIGS. 10 & 11 show the underside of full-body decoy body 30, where wing receiving slots 90—90, leg bar voids 92—92, knobs 94—94, 94—94 & 96—96, 96—96, a handle void 98, and a hand hole 99 are illustrated. FIG. 12 shows an enlarged view of the right side of decoy body 30, where upper knobs 94—94, lower knobs 96—96, and leg bar void 92 of right wing receiving slot 70 are illustrated. FIG. 13 shows the cross-sectional view of hollow decoy body 30 taken along 13—13 of FIG. 10 where handle void 98, leg bar voids 92—92, wing receiving slots 90—90 and handle hole 99 is illustrated. FIG. 14 shows the cross-sectional view of hollow foot-and-leg assembly 41 as taken along 14—14 of FIG. 1c where a handle 78 is illustrated. FIG. 15 shows the cross-sectional view of decoy 51 taken along 15—15 of FIG. 5 where wings 70—70 are shown fully inserted into wing receiving slots 90—90 and where a space is shown in handle hole 99 large enough for a hunter to place his hand in and remove foot-and-leg assembly 41 from decoy body 30 by pulling on handle 78. FIG. 15 also shows leg bars 72—72 of foot-and-leg assembly 41 mated in leg bar receiving voids 92—92 of decoy body 30.

As illustrated in FIG. 11 wing receiving slots 90—90 are non-parallely oriented with respect to longitudinal vertical bisecting plane 120 of decoy body 30. As illustrated in FIG. 14 straight, flat sided, parallel wings 70—70 of foot-and-leg assembly 41 are parallely oriented with respect to longitudinal vertical bisecting plane 120. Such orientation aligns wings 70—70 non-parallely with respect to wing receiving slots 90—90 when both decoy body 30 and foot-and-leg assembly 41 are in-line with vertical bisecting plane 120 as they would be lined-up when being attached together as illustrated in FIGS. 13 & 14. This non-parallel alignment causes wings 70—70 to biasly engage into slots 90—90 which removably securely attaches foot-and-leg assembly 41 to decoy body 30 by frictional engagement when wings 70—70 are fully inserted into wing receiving slots 90—90 as illustrated in FIG. 15. FIGS. 11 & 12 show that wing receiving slots 90—90 taper in longitudinal length from a longer length near the underside of the decoy body to a shorter length towards the top of the decoy body. The taper of wing receiving slots 90—90 is such so as to allow wings 70—70 to be completely inserted therein so that corresponding notches 74—74 & 76—76 of wings 70—70 mate with corresponding knobs 94—94 & 96—96 of wing receiving slots 90—90 thus adding to the stability of the removably secure attachment of decoy bodies 30 to corresponding foot-and-leg assemblies. When foot-and-leg assembly 41 is attached to decoy body 30 handle 78 mates in handle void 98 and leg bars 72—72 mate in leg bars voids 92—92 in such a manner as to ensure the non-parallel alignment of wings 70—70 with wing receiving slots 90—90 so that wings 70—70 biasly engage into slots 90—90 and foot-and-leg assembly 41 is removably securely attached to decoy body 30 by frictional engagement as is illustrated in FIGS. 7,9 & 15.

Attachment means as according to this invention has the intended meaning that a wing and wing receiving slot or their equivalent recessed and protruding entities of a decoy body or equivalent and a foot-and-leg assembly or equivalent are aligned non-parallely with respect to each other as determined when a corresponding decoy body and foot-and-leg assembly are in-line to be attached together. Such non-parallel alignment will cause sufficient frictional engagement to be created so as to removably securely attach the foot-and-leg assembly or equivalent to the decoy body or equivalent. According to the preferred embodiment of this invention as illustrated in FIGS. 1–15 the frictional engagement that holds each foot-and-leg assembly attached to a corresponding decoy body 30 is created when corresponding wings 70—70 and wing receiving slots 90—90 biasly engage into each other such that flexing of the decoy body's wing receiving slots and/or the foot-and-leg assembly's wings occur. Alignment means according to this invention has the intended meaning of any structure that maintains or insures the non-parallel alignment between the wing and wing receiving slots or their equivalents of decoy bodies and foot-and-leg assemblies so that such non-parallel alignment takes place and so that sufficient frictional engagement is generated to removably securely attach each foot-and-leg assembly to each corresponding decoy body. Removably securely attaching a foot-and-leg assembly to a decoy body has the intended meaning that the foot-and-leg assembly is attached to the decoy body in a manner secure enough to retain the decoy and foot-and-leg assembly attached during hunting use conditions such as loading, transporting, setting up decoys and during windy weather, but yet allows easy removal of the foot-and-leg assembly from the decoy body also.

It is apparent that there are many possible different arrangements or combinations of engagable protruding and recessed structures such as wings and wing receiving slots as according to the attachment means of this invention. It is also apparent that there are many possible different combinations of non-parallel alignment of such protruding and recessed structures according to the attachment means of this invention. It is yet further apparent that there are many accompanying ways to insure the non-parallel alignment of the engaging wing and wing receiving slots or slot or equivalents as according to the alignment means of this invention. For example embodiments utilizing different numbers of wing and slot combinations than disclosed herein, or embodiments having different oriented slot and wing directions than disclosed herein, or embodiments having different shaped wings and/or slots than disclosed herein, and embodiments without handles or having different handle styles than disclosed herein, could all conceivably produce decoys having attachment means and alignment means as according to this invention.

As has been set forth in this specification it is the over all objective of this invention to create decoys that have legs and feet in different natural positions so that when a plurality of such different shaped decoys are arranged in a natural setting such as a flock of geese would be in when feeding in a field, all of the common body positions and corresponding feet and leg positions exhibited by the animals being imitated are created, such that the decoy spread more realistically reproduces the group effect of those animals. Particularly for imitating geese, the goose decoys according to the present invention having feet and legs in different positions better imitate the waddling imagery of an actively feeding flock of geese walking around searching for and consuming food, and thus create a more realistic and effective decoy spread.

FIGS. 16*a*–16*e* illustrate another preferred decoy system embodiment according to this invention wherein a plurality of different shaped foot-and-leg assemblies 42 & 43 each having a different spatial arrangement of legs and feet than each other are each removably attachable to at least one decoy body of a plurality of different shaped decoy bodies 31 & 32. Foot-and-leg assembly 42 is removably attachable to decoy body 31 and produces a decoy 52 as shown in FIG. 17. Foot-and-leg assembly 43 is removably attachable to decoy body 32 and produces a decoy 53 as shown in FIG. 18. As according to the preferred embodiment of this invention as illustrated in FIGS. 16–18 a pair of thighs 66—66 are molded directly to each decoy body. The plurality of different shaped decoy bodies as according to the preferred embodiment as illustrated in FIGS. 16–18 differ in shape from each other substantially only in the locations where thighs 66—66 are molded onto corresponding decoy bodies 31 & 32. As illustrated in FIG. 16*a* decoy body 31 has right thigh 66 positioned rearward of left thigh 66. Whereas decoy body 32 as illustrated in FIG. 16*b* has both thighs 66—66 in-line with each other. It is apparent that the decoy bodies of the preferred embodiments of this invention comprising a plurality of different shaped decoy bodies, wherein the decoy bodies differ in shape from one another in the location of thighs, may also differ in shape from each other in the locations and shapes of where removably attachable head-and-neck pieces attach to the decoy bodies, as well as by other structural differences. Both foot-and-leg assemblies 42 & 43 each have a pair of stems 65—65 that mate within thighs 66—66 of corresponding decoy bodies when corresponding foot-and-leg assemblies are attached to corresponding decoy bodies as illustrated in FIGS. 17 & 18. Such mating of stems 65—65 with thighs 66—66 is another example of alignment means as according to this invention.

As according to the decoy systems and decoys of the preferred embodiments of this invention which have removably attachable foot-and-leg assemblies or removably attachable leg assemblies or their equivalents which removably attach to corresponding decoy bodies, the definition of a decoy body is meant to be the structure to which a foot-and-leg assembly or equivalent attaches, excluding the head and neck of such structure and excluding any standing aids such as stakes or bases. Accordingly, decoy bodies whether full-body types or shell body types which have removably attachable foot-and-leg assemblies may differ in shape from each other by a variety of different manners. For example, different shaped decoy bodies may be obtained by having different locations and shapes of where head-and-neck pieces attach or connect thereto whether removably or integrally so, or by having thighs or leg portions molded in different locations, or by having different feather patterns or other different physical shapes resulting from fabrication from different decoy mold patterns, or by having other anatomical variations in body position which correspond to the different kinesiological body movements involved in walking, and looking for and consuming food. As according to this invention, same shaped decoy bodies generally come from the same mold or equivalent or from copies of the same mold pattern.

FIGS. 16–18 show only two different shaped foot-and-leg assemblies 42 & 43 in the plurality of different shaped foot-and-leg assemblies, and only two different shaped decoy bodies 31 & 32 in the plurality of different shaped decoy bodies. It is apparent however as according to the decoy system of the preferred embodiment of this invention as illustrated in FIGS. 16–18, and as according to the other preferred embodiments of this invention that have a plurality of different shaped decoy bodies, that the number of different spatial arrangements of legs and feet and the number of different shaped decoy bodies in the plurality of different shaped decoy bodies can be enough to produce all of the common body positions and corresponding feet and leg positions exhibited by live geese, especially by live geese that are walking around and feeding. It is also apparent that a plurality of different shaped foot-and-leg assemblies each having a different spatial arrangement of legs and feet than each other, can all be individually removably attachable to one decoy body of a plurality of different shaped decoy bodies, as according to for example the preferred embodiment of this invention as illustrated in FIGS. 16–18.

FIGS. 19a–19e illustrate another preferred decoy system embodiment according to this invention wherein a plurality of different shaped foot-and-leg assemblies 40 & 41 that are removably attachable to full-body decoys, and that each have a different spatial arrangement of of legs and feet than each other, are each removably attachable to a plurality of same shaped shell decoy bodies 33. Such a decoy system for producing standing shell decoys, or decoys with decoy bodies having at least a portion of their underside open so as to be stackable upon each other, is accomplished according to one preferred embodiment of this invention by use of a coupler 100 as illustrated in FIG. 19e. Coupler 100 is preferably of a hollow plastic fabrication, but may be constructed of swaged wire or other materials. Coupler 100 has a pair of wing receiving slots 106—106, and a triplet of arms 102—102—102 that each have a detent 104 located at their distal terminuses. Each wing receiving slot 106 has a ridge 108 on its inner circumference. When corresponding foot-and-leg assemblies are in-line to be attached to corresponding couplers 100, slots 106—106 of each coupler 100 are non-parallely aligned with respect to corresponding wings 70—70, such that each foot-and-leg assembly is removably securely attached to each corresponding coupler 100 by frictional engagement when wings 70—70 are fully inserted into slots 106—106. This is illustrated in FIG. 20 for example, where foot-and-leg assembly 41 is attached to coupler 100. Such non-parallel alignment is another example of attachment means and alignment means, as according to this invention. Also aiding in the removably secure attachment of coupler 100 to foot-and-leg assembly 41 is the mating of lower notches 76—76 of each wing 70 with ridge 108 of each corresponding slot 106 as illustrated in FIG. 20. It is apparent that coupler 100 or its equivalent may have more than three arms 102 or equivalents and that arms 102 may be oriented in different directions or manners than suggested herein.

As illustrated in FIG. 21 when coupler 100 is attached to foot-and-leg assembly 40 and then attached to decoy body 33 each detent 104 mates in a hole 140 of decoy body 33, such that with the attachment of head-neck-piece 132, a self-standing shell decoy 54a with legs and feet is produced. As illustrated in FIG. 22 when coupler 100 is attached to foot-and-leg assembly 41 and then attached to decoy body 33 with attached head-neck-piece 132, a different self-standing shell decoy 54b is produced. It is apparent that there are many possible methods for attaching foot-and-leg assemblies each having a different spatial arrangement of feet and/or legs than each other to shell decoy bodies, as according to the shell decoy embodiments of this invention. It is apparent that the shape or shapes of detents 104 may be contoured such as to releasably lockingly engage with holes 140, so as to always insure a secure attachment of each coupler 100 to each shell decoy body 33. For example, a larger diameter bulb situated at the most distal terminus of each detent having a lesser diameter section immediately proximal thereto, could create such a snap fit locking mechanism when detents 104 are inserted into holes 140.

FIG. 23 shows that by removal of coupler 100 and corresponding foot-and-leg assembly that a laying shell decoy 54c is attainable. Shell decoy 54c when laid on the ground imitates a resting or laying goose.

FIG. 24 illustrates another preferred embodiment of this invention wherein a foot-and-leg assembly 44 that does not have a wire standing base is attached to shell decoy body 33. When head-and-neck piece 132 is then attached to shell decoy body 33 a decoy 54d is produced. A stake 114 is used to maintain decoy 54d in a standing position. It is apparent that as according to the scope of this invention that the decoys according to this invention may be erected in a standing position by many different methods in addition to the preferred method of wire standing bases 80, with out deterring from the desired results of having different spatial arrangement of legs and feet and of having of legs and feet in different positions. Such different methods may include stakes, plastic bases and the like.

FIGS. 25–29 illustrate other preferred decoy system embodiments according to this invention where, in each embodiment a plurality of same shaped decoy bodies each have a pair of legs integrally attached or molded thereto, such that each pair of legs and corresponding feet have a different spatial arrangement than the pairs of legs and feet attached to each other same shaped decoy body.

As according to the decoy systems and decoys of the preferred embodiments of this invention having non-removably attachable feet and/or legs or equivalents, wherein the legs are integrally attached or permanently molded to the decoy bodies, the definition of a decoy body is meant to be the structure of the decoy excluding the legs, head, neck, and any standing aids such as bases or stakes. Therefore, same shaped decoy bodies with integrally molded or attached legs can have thighs or leg portions molded on them in different locations or in different positions than each other and still be same shaped decoy bodies.

Figure 25:
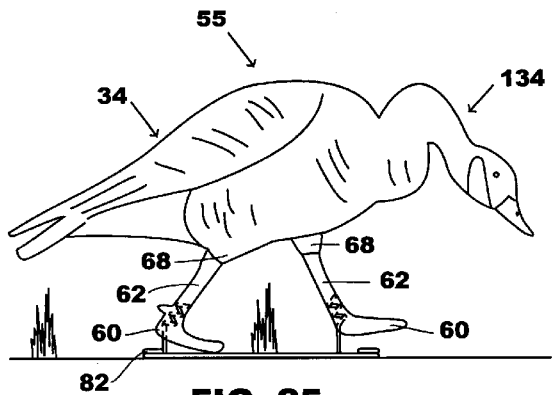
FIG. 25 is a side view of a full-body decoy with integrally attached legs and feet according to another preferred embodiment of this invention.
Figure 26:
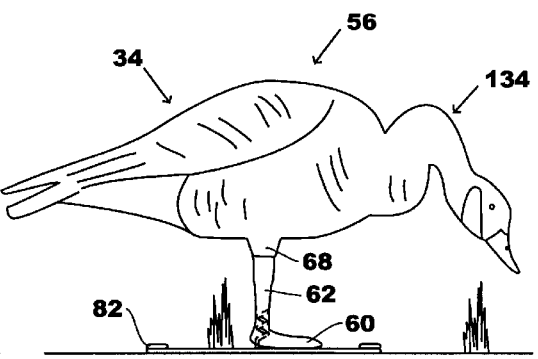
FIG. 26 is a side view of another full-body decoy with integrally attached legs and feet according to a preferred embodiment of this invention.
Figure 27:
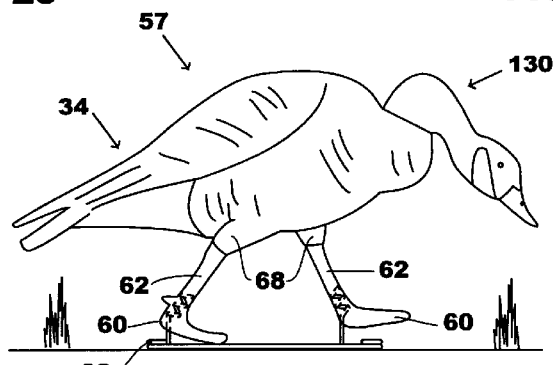
FIG. 27 is a side view of another full-body decoy with integrally attached legs and feet according to a preferred embodiment of this invention.

FIGS. 25–27 illustrate another preferred decoy system embodiment according to this invention wherein a plurality of same shaped full-body decoy bodies 34 & 34 & 34 each have a pair of calves 62—62, a pair of thighs 68—68 and a pair of feet 60—60 integrally attached or molded thereto, wherein each pair of legs and corresponding feet of each decoy have a different spatial arrangement than each other. A head-and-neck piece 134 is integrally attached or permanently molded to decoy bodies 35 & 36, whereas decoy body 37 has removably attachable head-and-neck piece 130 attached. Thighs 68—68 of decoy 57 are of slightly different shape than thighs 68—68 of decoy 55, and thus the legs and feet of decoy 57 have a different spatial arrangement than the legs and feet of decoy 55. Decoys 57 & 55 illustrate an example of how the legs and feet of two different decoys each having the same decoy body, but having legs and feet in different spatial arrangement than each other, position the same decoy bodies in the same position relative to the ground.

Figure 28:
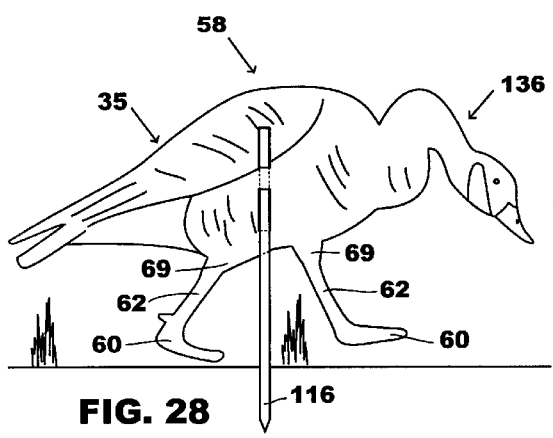
FIG. 28 is a side view of a silhouette decoy with integrally attached legs and feet according to another preferred embodiment of this invention.
Figure 29:
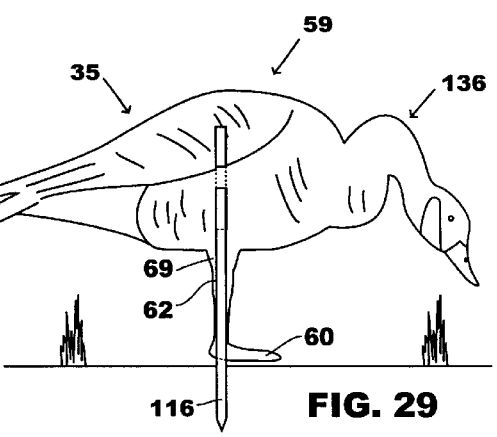
FIG. 29 is a side view of another silhouette decoy with integrally attached legs and feet according to a preferred embodiment of this invention.

FIGS. 28–29 illustrate another preferred decoy system embodiment according to this invention wherein a plurality of same shaped silhouette decoy bodies 35 & 35 each have a pair of calves 62—62, a pair thighs 69—69 and a pair of feet 60—60 integrally attached or molded thereto, wherein each pair of legs and corresponding feet have a different spatial arrangement than each other. A head-and-neck section 136 is integrally attached to each decoy body 35, and a stake 116 maintains each decoy in a standing position.

As has been set forth in this specification the decoys according to this invention have different spatially arranged legs and feet than each other. As is apparent to those skilled in the art it is possible to have decoys which do not have feet or their equivalents that produce the desired results of the decoys according to this invention. Accordingly, as used in the claims a leg-assembly or leg-assemblies, having different spatial arrangement of legs, is intended to have the same definition of different positions and different spatial arrangement of legs as such definitions that have been defined herein regarding foot-and-leg assemblies. The only difference being the possible absence of feet. A leg assembly is also intended to have such other foot-and leg assembly definitions applied thereto.

It is apparent that according to the scope of this invention foot-and-leg assemblies or leg assemblies or feet or legs or wire bases or other decoy parts may be comprised of several separately fabricated parts including those which may be removably attachable to each other, or those that may be integrally and/or non-removably attached or molded together. For example, it is possible to have individual, separate legs and feet that are removably attachable to each other. It is also possible to have individual legs that are separately removably attachable to corresponding decoy bodies. It also is apparent that a foot-and-leg assembly or a pair of legs and feet may be fabricated into one unitary integral structure.

It is apparent that the decoys according to this invention may be made to represent species of geese common in North America, such as the Canada goose, the speckle-belly or white-fronted goose, the snow goose and the blue goose. It is also apparent that the decoys according to this invention may imitate species of geese from other parts of the world as well.

As the above discussions of the preferred embodiments of this invention have extensively involved goose decoys it is of necessity to point out that the scope and desired results according to this invention are applicable to decoys imitating other bird species and also to decoys imitating other animal species as well, including those that have more than two legs, such as deer and antelope. It is also apparent that the decoy body types according to this invention are not limited to full-body types, shell decoy body types and silhouette decoy body types, but may include other decoy body types, such as other substantially three-dimensional decoy body types like kites and rags, or various different combinations thereof It is also apparent that the decoy body types according to this invention may include various different combinations of any of the different decoy body types.

It is apparent that the head-and-neck sections or pieces of the decoys of this invention may also have different shapes and positions which correspond to the exact position a goose's head and neck would be in for each given corresponding foot, leg and body position produced by each decoy of the decoys and decoy systems of this invention. For example, the neck may bend near the base or slightly thereabove in the direction opposite the side of the body that the forwardly placed foot is on.

The full-body decoy bodies, and shell decoy bodies according to this invention are preferably substantially thin walled plastic structures that are manufactured preferably by the processes of blow molding and/or rotational molding. The foot-and-leg assemblies and feet and/or legs of the decoys according to this invention are preferably also manufactured by blow molding and/or rotational molding and preferably have the wire standing bases integrally molded to the feet during the plastic manufacturing process. It is apparent that the various decoy parts of the decoys according to this invention may be manufactured by processes other than blow molding or rotational molding and that they may not be hollow, or may not be completely hollow, and that they may be made of various different plastics, and other synthetic materials such as fiberglass and foam, and that they may be made of wood, cork or metal or other suitable materials.

It is apparent that various movement inducing devices may be incorporated with the decoys and decoy systems of this invention, so as to either cause the decoys to have movement individually or collectively, or to cause appendages attached to the decoys to have movement. It is also apparent that different floating devices may be attached or otherwise involved with the decoys of this invention to enable the decoys to float.

It is apparent that different decoy systems and decoys as according to the desired results of this invention exist which have not been discussed above. It is apparent that the different parts and their equivalents as according to the decoy systems and the decoys of this invention, as discussed above and as according to other preferred embodiments of this invention, can be changed, or interchanged, or eliminated, or duplicated, or made of different materials, and connected to or associated with adjacent elements in different manners, other than suggested herein, without deterring from the desired results of the decoys according to this invention.

It is to be understood that the present invention is not limited to the sole embodiments described above, as will become apparent to those skilled in the art, but encompasses the essence of all embodiments, and their legal equivalents, within the scope of the following claims.

I claim:

1. A decoy system for producing decoys comprising:
   (a) a decoy body; and
   (b) a plurality of different shaped leg assemblies, each said leg assembly comprising a pair of legs that are rigidly mounted relative to each other, each pair of legs of each said leg assembly having a different spatial arrangement than the pairs of legs of each of the other said leg assemblies of said plurality of different shaped leg assemblies, and each said leg assembly being individually removably attachable to said decoy body, wherein the plurality of different shaped leg assemblies include:
   (i) a select first leg assembly chosen from the plurality of different shaped leg assemblies, the pair of legs of the first leg assembly being rigidly spaced apart in an open walking position; and
   (ii) a select second leg assembly chosen from the plurality of different shaped leg assemblies, the pair of legs of the second leg assembly being rigidly disposed in substantially parallel alignment in a standing position.

2. A decoy system as recited in claim 1, wherein only one leg assembly of said plurality of different shaped leg assemblies is attachable to said decoy body at a time.

3. A decoy system as recited in claim 2, wherein said decoy body is a goose decoy body resembling a goose.

4. A decoy system as recited in claim 3, wherein when each of said different shaped leg assemblies is individually attached to said goose decoy body, said goose decoy body is positioned in a different position relative to a surface, when placed upon said surface, than the position said goose decoy body is positioned in relative to said surface when having the other said different shaped leg assemblies individually attached thereto and correspondingly placed upon said surface.

5. A decoy system as recited in claim 4, wherein said goose decoy body is a shell decoy body.

6. A decoy system for producing decoys comprising:
   (a) a plurality of different shaped decoy bodies; and
   (b) a plurality of different shaped leg assemblies, each said leg assembly comprising a pair of legs, each pair of legs of each said leg assembly having a different spatial arrangement than the pairs of legs of each of the other said leg assemblies of said plurality of different shaped leg assemblies, and each said leg assembly being individually removably attachable to at least one decoy body of said plurality of different shaped decoy bodies, wherein the plurality of different shaped leg assemblies include:
   (i) a select first leg assembly chosen from the plurality of different shaped leg assemblies, the pair of legs of the first leg assembly being rigidly spaced apart in an open walking position; and
   (ii) a select second leg assembly chosen from the plurality of different shaped leg assemblies, the pair of legs of the second leg assembly being rigidly disposed in substantially parallel alignment in a standing position.

7. A decoy system comprising:
   (a) a decoy body; and
   (b) a plurality of different shaped leg assemblies, each said leg assembly comprising a pair of legs, each pair of legs of each said leg assembly having a different spatial arrangement than the pairs of legs of each of the other said leg assemblies of said plurality of different shaped leg assemblies, and each said leg assembly being individually removably attachable to said decoy body, wherein the plurality of different shaped leg assemblies include:
   (i) a select first leg assembly chosen from the plurality of different shaped leg assemblies, the pair of legs of the first leg assembly being rigidly spaced apart in an open walking position; and
   (ii) a select second leg assembly chosen from the plurality of different shaped leg assemblies, the pair of legs of the second leg assembly being rigidly disposed in a configuration different than the first leg assembly.

* * * * *